(12) United States Patent
Wu et al.

(10) Patent No.: US 12,088,189 B2
(45) Date of Patent: Sep. 10, 2024

(54) ZERO-CROSSING STATE DETECTION DEVICE FOR CONVERTER

(71) Applicant: Shanghai Hanmai Electronic Technology Co., Ltd, Shanghai (CN)

(72) Inventors: Xiaohui Wu, Shanghai (CN); Lilong Wang, Shanghai (CN)

(73) Assignee: Shanghai Hanmai Electronic Technology Co., Ltd, Shanghai (CN)

( * ) Notice: Subject to any disclaimer, the term of this patent is extended or adjusted under 35 U.S.C. 154(b) by 0 days.

(21) Appl. No.: 18/098,067

(22) Filed: Jan. 17, 2023

(65) Prior Publication Data

US 2023/0369960 A1 Nov. 16, 2023

(30) Foreign Application Priority Data

Jan. 24, 2022 (CN) .......................... 202210081780.1

(51) Int. Cl.
*H02M 1/08* (2006.01)
*H02M 1/00* (2006.01)
*H02M 3/158* (2006.01)

(52) U.S. Cl.
CPC ......... *H02M 1/083* (2013.01); *H02M 1/0009* (2021.05); *H02M 3/158* (2013.01)

(58) Field of Classification Search
CPC .... H02M 1/083; H02M 1/0009; H02M 3/158; H02M 1/0032; H02M 1/0058; H02M 1/088; H02M 1/38; G01R 19/175
See application file for complete search history.

(56) References Cited

U.S. PATENT DOCUMENTS

2014/0062365 A1* 3/2014 Reynolds ................ H02P 6/153
318/400.35

\* cited by examiner

*Primary Examiner* — Jung Kim
(74) *Attorney, Agent, or Firm* — IPRTOP LLC

(57) ABSTRACT

A zero-crossing state detection device for a converter and a converter device. The converter includes a first type of power switch electrically coupled between an input terminal and a switch node, a second type of power switch electrically coupled between the switch node and a ground terminal, and an inductor electrically coupled between the switch node and an output terminal. The zero-crossing state detection device includes: a zero-crossing state indication circuit, which is configured to generate an indication signal indicating the zero-crossing state of the inductor current flowing through the inductor, based on a voltage at the switch node after the second type of power switch is turned off and before the first type of power switch is turned on, according to first and second driving signals respectively applied to the first type of power switch and the second type of power switch. Efficiently and accurately monitoring the zero-crossing state of the inductor current cycle by cycle in real-time, serving as a basis for switching between different operating modes of light load and heavy load of the converter.

19 Claims, 3 Drawing Sheets

ZERO-CROSSING STATE DETECTION DEVICE FOR CONVERTER

CROSS REFERENCE TO RELATED APPLICATION

The present application claims the benefit of priority to Chinese Patent Application No. CN 2022100817801, entitled "ZERO-CROSSING STATE DETECTION DEVICE FOR CONVERTER AND CONVERTER DEVICE", filed with CN IPA on Jan. 24, 2022, the disclosure of which is incorporated herein by reference in its entirety for all purposes.

FIELD OF TECHNOLOGY

The present disclosure is related to the field of power management technology, particularly to a zero-crossing state detection device for a converter and a converter device.

BACKGROUND

A Buck Converter, also known as a step-down converter, is a non-isolated single-tube DC converter where the output voltage is less than the input voltage.

At present, in battery-powered portable devices, increasing attention is being paid to standby time. The smaller the power consumption of the SOC system during standby, the longer the standby time. A switching power supply, that powers different devices on the system, will be operating in a light-load mode during standby, requiring high conversion efficiency. BUCK converters, which can achieve high-to-low voltage conversion, are required to work in a PFM mode or Burst mode, both of which are suitable for light loads.

There are two main methods for determining whether the load is heavy or light: the first method involves directly measuring the load current by connecting a detection resistor in series on the power branch or at the load end. The second method involves indirectly measuring the load current by checking if the inductor current drops to zero or below during the freewheeling stage. The first method, which involves directly measuring the load current, has a drawback: the additional detection resistor increases the impedance of the power path, causing increased conduction loss and reduced conversion efficiency when the switching power supply is operating under heavy load. The second method, which involves indirectly measuring the load current, avoids this issue by not requiring an additional detection resistor, resulting in higher conversion efficiency.

SUMMARY

The present disclosure provides a zero-crossing state detection device for a converter, and a converter device for accurately monitoring the zero-crossing state of the inductor current in the converter.

In the first aspect, an embodiment of the present disclosure provides a zero-crossing state detection device for a converter. The converter includes a first type of power switch electrically coupled between an input terminal and a switch node, a second type of power switch electrically coupled between the switch node and a ground terminal, and an inductor electrically coupled between the switch node and an output terminal. The zero-crossing state detection device includes a zero-crossing state indication circuit, configured to generate an indication signal indicating a zero-crossing state of an inductor current flowing through the inductor, according to a first driving signal and a second driving signal respectively applied to the first type of power switch and the second type of power switch, based on a voltage at the switch node after the second type of power switch is turned off and before the first type of power switch is turned on.

In an embodiment of the present disclosure, the zero-crossing state indication circuit is configured to: generate a first indication signal indicating that an event of the inductor current being less than zero occurs if the voltage at the switch node is a first preset value; and generate a second indication signal indicating that the event of the inductor current being less than zero has not occurred if the voltage at the switch node is a second preset value.

In an embodiment of the present disclosure, the zero-crossing state indication circuit is configured to generate the indication signal indicating whether the inductor current has crossed zero within a switching cycle corresponding to the first driving signal and the second driving signal, in response to an active edge of the first driving signal.

In an embodiment of the present disclosure, it further includes: a transistor, having a control terminal electrically coupled to a reference voltage terminal, a first conductive terminal electrically coupled to the switch node, and a second conductive terminal electrically coupled to a power source terminal and electrically coupled to the zero-crossing state indication circuit.

In an embodiment of the present disclosure, the zero-crossing state indication circuit is configured to: generate a first indication signal indicating that an event of the inductor current being less than zero occurs, if the voltage at the switch node causes the transistor to be turned off so that an output voltage at the second conductive terminal of the transistor is pulled up to a high level; and generate a second indication signal indicating that the event of the inductor current being less than zero has not occurred, if the voltage at the switch node causes the transistor to be turned on so that the output voltage at the second conductive terminal of the transistor is pulled down to a low level.

In an embodiment of the present disclosure, the zero-crossing state indication circuit includes: a first flip-flop, electrically coupled to the second conductive terminal of the transistor, and configured to output an intermediate signal corresponding to an output voltage at the second conductive terminal of the transistor based on the second driving signal; and a second flip-flop, electrically coupled to an output terminal of the first flip-flop, and configured to output the indication signal corresponding to the intermediate signal based on the first driving signal.

In an embodiment of the present disclosure, the zero-crossing state indication circuit includes: a first inverter, a first flip-flop, a second flip-flop, and a second inverter, which are connected in sequence; the first inverter inverts an output voltage of the second conductive terminal of the transistor to output a first logic signal to the first flip-flop; the first flip-flop outputs a second logic signal to the second flip-flop based on the input first logic signal; the second flip-flop receives a delay logic signal generated based on the first driving signal, and samples the second logic signal based on the delay logic signal to output a third logic signal to the second inverter; the second inverter inverses the third logic signal to output the indication signal indicating the zero-crossing state of the inductor current.

In one embodiment of this disclosure, the zero-crossing state indication circuit is configured to: generate the indication signal at a low level to indicate that the inductor current is greater than zero, when the voltage at the switch node causes the transistor to be turned on so that the output voltage at the second conductive terminal of the transistor is pulled down to a low level, and the first logic signal, the second logic signal and the third logic signal are all at a high level; and generate the indication signal at a high level to indicate that an event of the inductor current being less than zero occurs, when the voltage at the switch node causes the transistor to be turned off so that the output voltage at the second conductive terminal of the transistor is equal to a power supply voltage, and the first logic signal, the second logic signal and the third logic signal are all at a low level.

In one embodiment of this disclosure, the first flip-flop receives a reset logic signal generated based on the second driving signal, such that the first flip-flop resets the second logic signal output by the first flip-flop after the first type of power switch is turned off and before the second type of power switch is turned on within a previous switching cycle, based on the reset logic signal.

In one embodiment of this disclosure, there is also a current source, electrically coupled between the second conductive terminal of the transistor and the power source terminal.

In one embodiment of this disclosure, the reference voltage of the reference voltage terminal is less than a conduction voltage of a first freewheeling diode or a second freewheeling diode, parasitically paralleled with the first type of power switch or the second type of power switch.

In one embodiment of this disclosure, the first type of power switch includes a PMOS power switch, and the second type of power switch includes an NMOS power switch.

In one embodiment of this disclosure, the transistor includes a bipolar junction transistor.

In one embodiment of this disclosure, the zero-crossing state indication circuit is configured to: generate a first indication signal indicating that an event of the inductor current being less than zero occurs if the voltage at the switch node is equal to an input voltage of the input terminal plus 0.7V such that the transistor is turned off; and generate a second indication signal indicating that the event of the inductor current being less than zero has not occurred if the voltage at the switch node is equal to −0.7V such that the transistor is turned on.

On the second aspect, an embodiment of this disclosure also provides a converter device. The converter device includes: a converter, including a first type of power switch electrically coupled between an input terminal and a switch node, a second type of power switch electrically coupled between the switch node and a ground terminal, an inductor electrically coupled between the switch node and an output terminal, a power switch driving circuit electrically coupled to the first type of power switch and the second type of power switch, and a converter loop control circuit for controlling the power switch driving circuit; and the aforementioned zero-crossing state detection device.

The zero-crossing state detection device for the converter according to embodiments of the present disclosure can efficiently and accurately monitor the zero-crossing state of the inductor current cycle by cycle in real-time, indirectly determine the actual output load of the current converter, and can serve as a basis for switching between different working modes of light load and heavy load of the converter.

DETAILED DESCRIPTION

The following embodiments of the present disclosure are illustrated by specific concrete examples, and other advantages and benefits of the present disclosure can be readily understood by those skilled in the art as disclosed herein. The present disclosure may also be implemented or applied by other different specific embodiments, and various details in this specification may be modified or changed in various ways based on different views and applications without departing from the spirit of the present disclosure. It should be noted that, in the absence of conflict, the following embodiments and features in some embodiments may be combined with each other.

It should be noted that drawings provided in the following examples illustrate the basic ideas of the present disclosure in a schematic manner only, so that components related to the present disclosure are only shown in drawings and do not in accordance with the number, shape and size of components when actually implemented. The shape, number, and size of each component in actual implementation may be changed as needed, and the layout of components may also be more complex.

Figure 1:
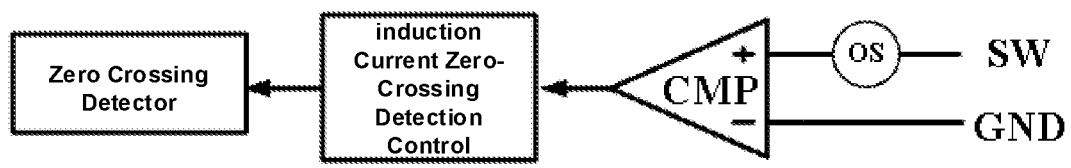
FIG. 1 shows a schematic diagram illustrating a principle of a circuit for detecting zero-crossing of inductor current in a BUCK converter in the prior art.

FIG. 1 shows a conventional inductor current zero-crossing detection scheme. As shown in FIG. 1, a first terminal of a zero-crossing-detector (ZCD) comparator CMP is connected to a switch node SW voltage, and a second terminal of the ZCD comparator CMP is connected to a GND terminal to introduce an offset voltage Vos, and the ZCD comparator CMP directly compares the voltages at SW and GND to make a determination. The comparator CMP outputs a corresponding determination result to the inductor current zero-crossing detection control, realizing zero-crossing detection of the zero crossing detector. Usually, in order to more accurately determine zero-crossing states, an additional offset voltage Vos needs to be introduced. Set Vos= (Vout/L)*Tdly*Ron_mn, where Vout is an output voltage of a BUCK converter, L is a power inductor of the BUCK converter, Tdly is a sum of a detection delay and a drive logic delay of the ZCD comparator CMP, and Ron_mn is a conduction impedance of an NMOS of the BUCK converter freewheeling switch. At this point, the precise detection of an inductor current zero-crossing state can be well achieved. However, in practice, three key parameters Tdly/L/Ron_mn in the above equation are greatly affected by the ambient temperature and process deviations, leading to a degradation of the detection accuracy of the zero-crossing states, which is not conducive to mode switching. Moreover, Tdly (i.e., delay) is quite large in conventional manufacturing processes, and is often around 100 ns, so the traditional detection method is not suitable for a high-frequency switching power supply.

In order to solve at least the above problems, embodiments of the present disclosure provide a zero-crossing state detection scheme for a converter, for accurately monitoring the inductor current zero-crossing state in the converter. According to embodiments of the present disclosure, the accurate monitoring of the inductor current zero-crossing state is achieved by directly monitoring a voltage at a switch node at the end of a freewheeling stage, i.e., a dead-zone voltage after a second type of power switch (such as NMOS power switch) is turned off and before a first type of power switch (such as PMOS power switch) is turned on, in combination with gate drive logic signals of each power switch, and the inductor current zero-crossing state thus can be determined. In this way, the inductor current zero-crossing state can be accurately and efficiently detected without a comparator and introduction of offset.

A zero-crossing state detection device for a converter and a converter device of the present disclosure will be elaborated in detail below, so that those skilled in the art can understand the concept of this disclosure without inventive labor.

Figure 2:
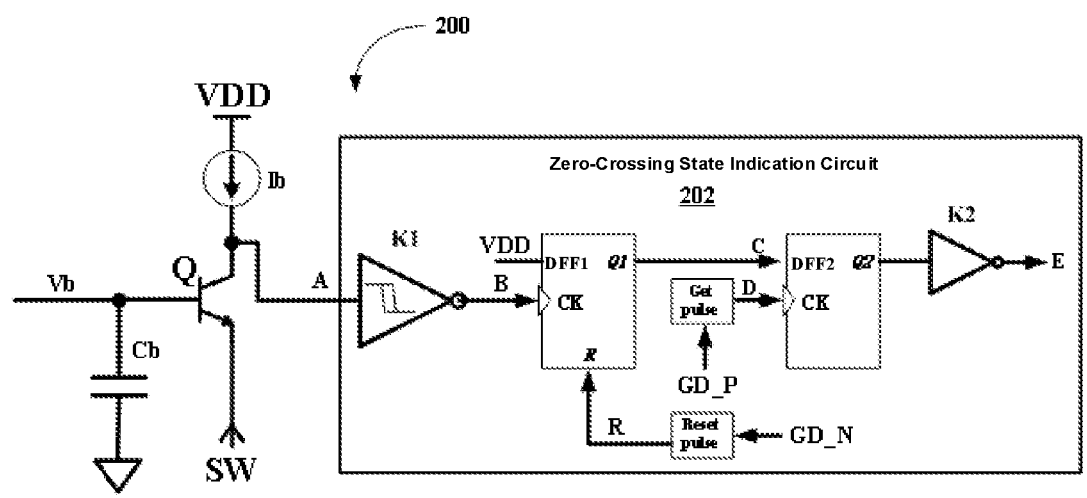
FIG. 2 shows a schematic circuit diagram of a zero-crossing detection circuit of a converter according to the present disclosure.

FIG. 2 is a block diagram showing a zero-crossing state detection device 200 for a converter according to an embodiment of the present disclosure. As shown in FIG. 2, the zero-crossing state detection device 200 includes a zero-crossing state indication circuit 202.

Figure 3:
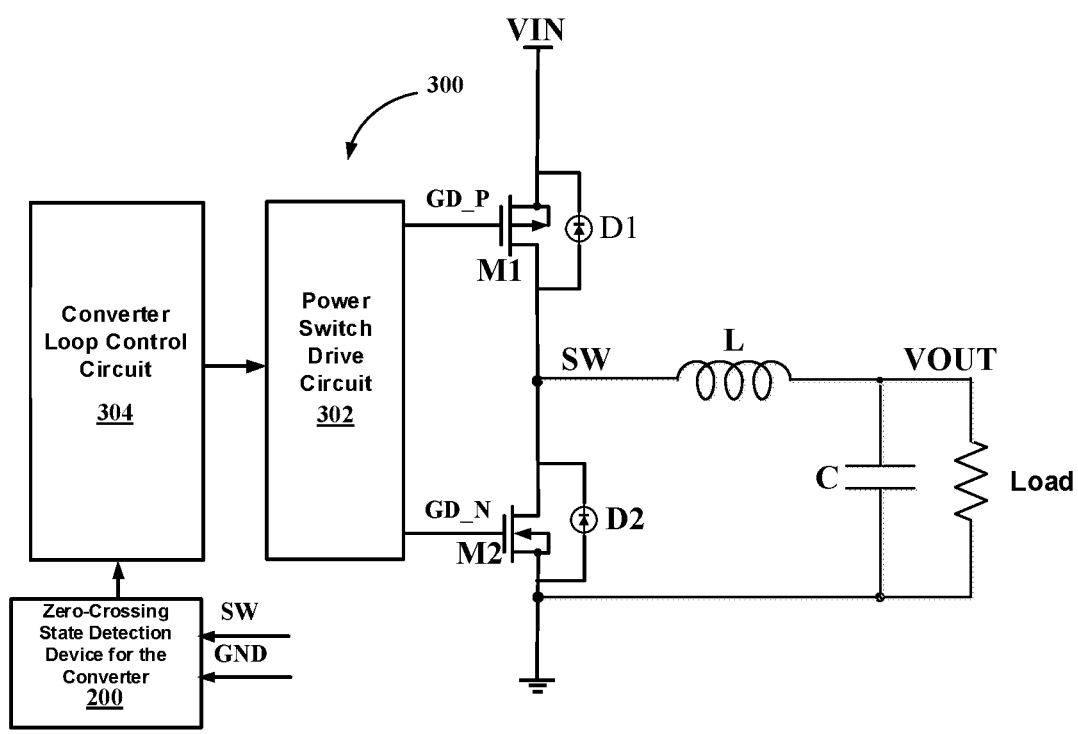
FIG. 3 shows a schematic circuit diagram of a converter applying the zero-crossing detection circuit according to the present disclosure.

FIG. 3 is a block diagram showing a converter device 300 to which the zero-crossing state detection device 200 is applied according to an embodiment of the present disclosure. As shown in FIG. 3, the converter includes: a first type of power switch M1 electrically coupled between an input terminal and a switch node SW, a second type of power switch M2 electrically coupled between the switch node SW and a ground terminal, an inductor L electrically coupled between the switch node SW and an output terminal, a power switch driving circuit 302 electrically coupled to the first type of power switch M1 and the second type of power switch M2, and a converter loop control circuit 304 controlling the power switch driving circuit 302.

Preferably, in one embodiment, the first type of power switch M1 is a PMOS power switch, and the second type of power switch M2 is an NMOS power switch. In another embodiment, the first type of power switch M1 is an NMOS power switch and the second type of power switch M2 is a PMOS power switch. Hereinafter, it is assumed that the first type of power switch M1 is a PMOS power switch, and the second type of power switch M2 is an NMOS power switch.

Specifically, the PMOS power switch includes a first freewheeling diode D1, and the NMOS power switch includes a second freewheeling diode D2. A point at which a second end of the inductor L is connected to the PMOS power switch and the NMOS power switch serves as the switch node SW. The zero-crossing state detection device 200 detects the zero-crossing state of the inductor L based on the voltage at the switch node SW.

In one embodiment, the accurate monitoring of the inductor current zero-crossing state of the inductor L is achieved by directly monitoring the dead-zone voltage at the switch node SW at the end of the freewheeling stage (i.e., after the NMOS power switch is turned off and before the PMOS power switch is turned on), as well as variations of the inductor current of the inductor L when in a zero-crossing state or a non-zero-crossing state, and by combining gate drive logics of both the NMOS power switch and the PMOS power switch.

Figure 4:
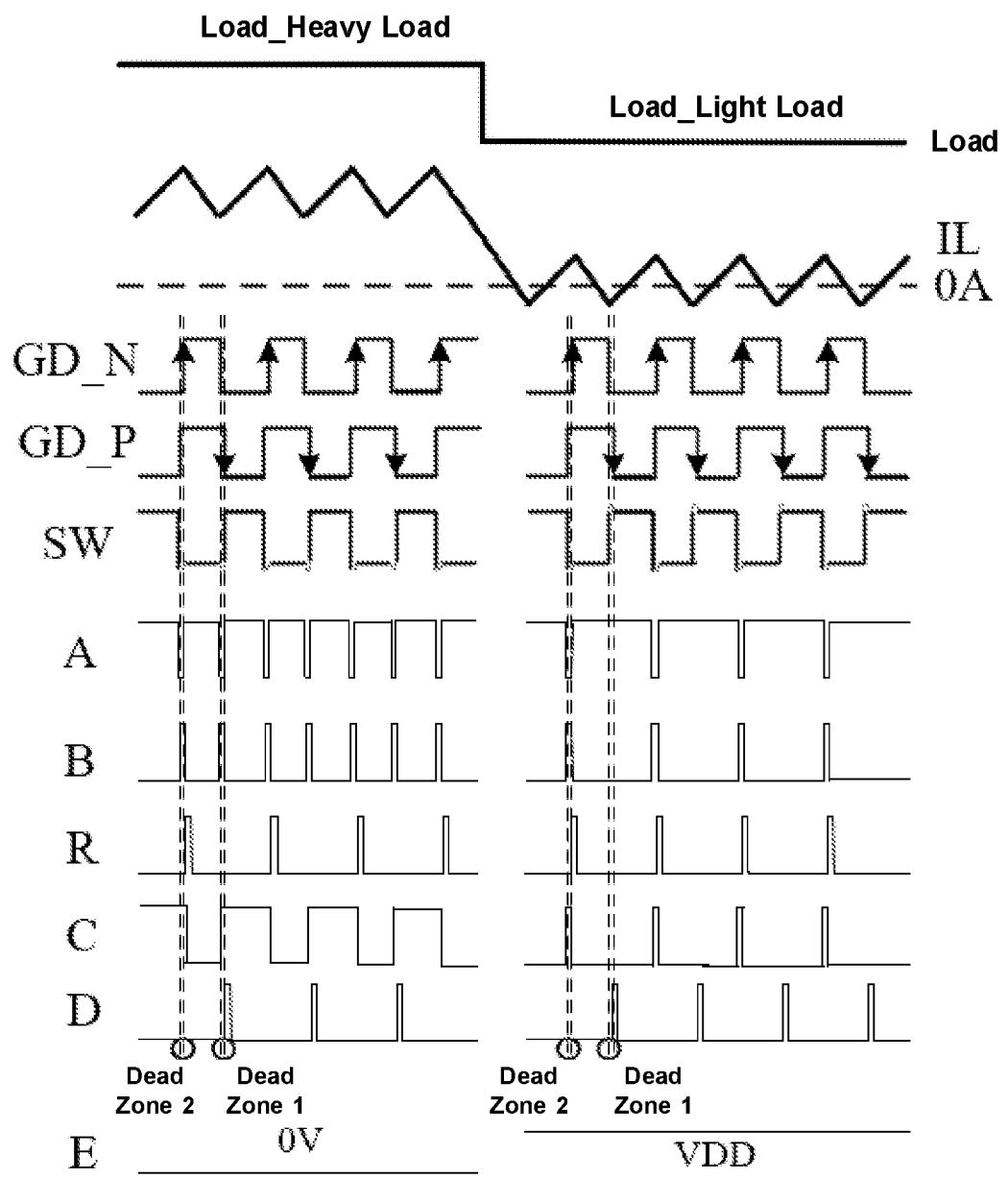
FIG. 4 shows key waveforms of an inductor current zero-crossing detection in the zero-crossing detection circuit of the converter according to the present disclosure.

As shown in FIG. 4, state waveforms of the inductor current of the inductor L are shown in two different conditions, i.e., a heavy load condition and a light load condition.

When the load is heavy, the inductor current of the inductor L is always greater than zero. At the end of the freewheeling, the inductor current of the inductor L freewheels clockwise through the diode D2 of the NMOS power switch. At this time, the voltage at the switch node SW is equal to a conduction voltage drop of the diode D2 in the NMOS power switch, which is usually around −0.7V.

When the load is light, the inductor current of the inductor L will change from greater than zero to less than zero during the freewheeling stage, when the PMOS power switch is turned off and the NMOS power switch is turned on, at which time the inductor current direction changes from clockwise to counterclockwise. At the end of the freewheeling stage, after the NMOS power switch is turned off and before the PMOS power switch is turned on, the inductor current of the inductor L freewheels counterclockwise through the diode D1 of the PMOS power switch. At this time, the voltage at the switch node SW is equal to an input voltage VIN superimposed by a conduction voltage drop of the diode D1, which is usually around VIN+0.7V.

In one embodiment, when the transistor Q is turned on by the voltage monitored at the switch node SW, the voltage monitored at the switch node SW is −0.7V; when the transistor Q is turned off by the voltage monitored at the switch node SW, the voltage monitored at the switch node SW is the input voltage of the converter, which equals +0.7V.

The circuit structure of the zero-crossing state detection device 200 will be exemplarily described in detail below.

In one embodiment, the zero-crossing state detection device 200 includes a zero-crossing state indication circuit 202. The zero-crossing state indication circuit 202 is configured to generate an indication signal indicating a zero-crossing state of an inductor current flowing through the inductor based on the voltage of at switch node SW after the second type of power switch M2 is tuned off and before the first type of power switch M1 is turned on, according to a first driving signal GD_P and a second driving signal GD_N respectively applied to the first type of power switch M1 and the second type of power switch M2.

Specifically, the first driving signal GD_P applied to the first type of power switch M1 is used for delay sampling to obtain the indication signal indicating the zero-crossing state of the inductor current flowing through the inductor. Specifically, the zero-crossing state indication circuit 202 is configured to generate an indication signal indicating whether the inductor current crosses zero within a switching cycle corresponding to the first driving signal GD_P and the second driving signal GD_N, in response to an active edge of the first driving signal GD_P.

The second driving signal GD_N applied to the second type of power switch M2 is used for delay reset to ensure correct voltage detection at the switch node SW during a dead-zone-1 stage in each switching cycle.

Specifically, the zero-crossing state indication circuit 202 is configured to: if the voltage at the switch node SW is of a first preset value, generate a first indication signal indicating that the inductor current is less than zero; and if the voltage at the switch node SW is of a second preset value, generate a second indication signal indicating that the event that the inductor current is less than zero did not occur.

In one embodiment, the zero-crossing state detection device 200 also includes: a transistor Q, which includes, but not limited to, a bipolar junction transistor.

In one embodiment, a control terminal of the transistor Q is electrically coupled to a reference voltage terminal, a first conductive terminal of the transistor Q is electrically coupled to the switch node SW, and a second conductive terminal of the transistor Q is electrically coupled to a power source terminal and to the zero-crossing state indication circuit 202.

In one embodiment, the zero-crossing state detection device 200 also includes a current source Ib, which is electrically coupled between the second conductive terminal of the transistor Q and the power source terminal.

As shown in FIG. 2, in one embodiment, the control terminal of the transistor Q is a base output terminal, the first conductive terminal is an emitter output terminal, and the second conductive terminal is a collector output terminal.

In other words, in this embodiment, the emitter of the transistor Q is electrically coupled to the switch node SW, and the voltage monitored at the switch node SW is inputted to the emitter of the transistor Q. The collector of the transistor Q is connected to the power source terminal (reference current Ib), and the base of the transistor Q is connected to a reference voltage Vb.

In this embodiment, the reference voltage at the reference voltage terminal is less than the conduction voltage of the first freewheeling diode or the second freewheeling diode, which are parasitically paralleled with the first type of power switch M1 or the second type of power switch M2, and the reference voltage at the reference voltage terminal is also less than a conduction voltage of the transistor Q.

Specifically, in one embodiment, as shown in FIG. 2, the reference current Ib is outputted through a current comparator connected to an external power supply VDD. The reference voltage Vb is less than the conduction voltage of the first freewheeling diode D1 or the second freewheeling diode D2, and the reference voltage Vb is also less than the conduction voltage of the transistor Q. Therefore, detection logic outputs will not be triggered by mistake due to the conduction of the transistor Q in the normal freewheeling stage of the inductive current, i.e., the period when the NMOS power switch is turned on and the PMOS power switch is turned off.

As shown in FIG. 2, the base of the transistor Q is connected to the reference voltage Vb. The reference voltage Vb must be less than the conduction voltage drop of the diode D2 in the NMOS power switch or the diode D1 in the PMOS power switch, and at the same time, the reference voltage Vb is also less than the conduction voltage of the transistor Q. The reference voltage Vb can be set to Vb=100 mV or connected to the GND voltage, for example. The collector of the transistor Q is biased with such a reference current Ib that a detection voltage A can be rapidly inverted.

The voltage at the switch node SW after the second type of power switch M2 is tuned off and before the first type of power switch M1 is turned on in each switching cycle is an output voltage of the collector of the transistor Q. In this embodiment, the collected output voltage of the collector of the transistor Q is utilized as the detection voltage, based on which the zero-crossing state of the inductor L is determined.

In one embodiment, the zero-crossing state indication circuit 202 is configured as follows: if the voltage at the switch node SW causes the transistor Q to turn off, thus pulling up the output voltage at the second conductive terminal of the transistor Q to a high level, the first indication signal is generated to indicate that the inductor current is less than zero; and if the voltage at the switch node SW causes the transistor Q to turn on, thereby pulling down the output voltage at the second conductive terminal of the transistor Q to a low level, the second indication signal is generated to indicate that the event that the inductor current is less than zero has not occurred.

Specifically, in this embodiment, the zero-crossing state indication circuit 202 is configured to: if the voltage at the switch node SW is equal to an input voltage of the input terminal plus 0.7V such that the transistor Q is turned off, generate the first indication signal indicating that the inductor current is less than zero; and if the voltage at the switch node SW equals −0.7V such that the transistor Q is turned on, generate the second indication signal indicating that the event that the inductor current is less than zero has not occur.

More specifically, in this embodiment, the zero-crossing state indication circuit 202 determines the zero-cross state of the inductor L as follows: 1) When the transistor Q is turned off by the voltage monitored at the switch node SW, the output voltage of the collector of the transistor Q is pulled up to a high level, and the output voltage of the collector of the transistor Q equals the reference current Ib, the first indication signal indicating that the inductor current is less than zero is thus generated, determining that the inductor current of the inductor L is less than zero. In other words, when the detection voltage A is indicated to be a high level, and indicated to be the reference current Ib, the inductor current of the inductor L is determined to be less than zero; 2) When the transistor Q is turned on by the voltage monitored at the switch node SW, the output voltage of the collector of the transistor Q is pulled down to a low level, the second indication signal indicating that the event that the inductor current is less than zero has not occur is thus generated, determining that the inductor current of the inductor L is greater than zero. In other words, when the detection voltage A is indicated to be a low level, the inductor current of the inductor L is determined to be greater than zero.

In one embodiment, the zero-crossing state indication circuit 202 includes a first flip-flop DFF1 and a second flip-flop DFF2, as shown in FIG. 2.

Specifically, the first flip-flop DFF1 is electrically coupled to the second conductive terminal of the transistor Q and is configured to output an intermediate signal corresponding to the output voltage of the second conductive terminal of the transistor Q based on the second driving signal GD_N. The second flip-flop DFF2 is electrically coupled to an output terminal of the first flip-flop DFF1, and is configured to output an indication signal corresponding to the intermediate signal based on the first driving signal GD_P.

More specifically, in this embodiment, the first flip-flop DFF1 receives a reset logic signal generated based on the second driving signal GD_N, so that the first flip-flop DFF1 resets the second logic signal output to the first flip-flop DFF1 during the previous switching cycle after the first type of power switch M1 is turned off and before the second type of power switch M2 is turned on, based on the reset logic signal.

In one embodiment, the zero-crossing state indication circuit 202 includes: a first inverter K1, the first flip-flop DFF1, the second flip-flop DFF2, and a second inverter K2, which are connected in sequence. The first inverter K1 inverts the output voltage of the second conductive terminal of the transistor Q to output a first logic signal to the first flip-flop DFF1. The first flip-flop DFF1 outputs a second logic signal to the second flip-flop DFF2 based on the first logic signal. The second flip-flop DFF2 receives a delay logic signal generated based on the first driving signal GD_P, and samples the second logic signal based on the delay logic signal to output a third logic signal to the second inverter K2. The second inverter K2 inverts the third logic signal to output an indication signal indicating the zero-crossing state of the inductor current.

In one embodiment, the zero-crossing state indication circuit 202 is configured as follows: when the transistor Q is turned on by the voltage at the switch node SW, the output voltage of the second conductive terminal of the transistor Q is pulled down to a low level, the first logic signal, the second logic signal and the third logic signal are all at a high level, thus generating an indication signal at a low level to indicate that the inductor current is greater than zero; when the transistor Q is turned off by the voltage at the switch node SW, the output voltage of the second conductive terminal of the transistor Q is equal to a power supply voltage, the first logic signal, the second logic signal and the third logic signal are all at a low level, thereby generating an indication signal at a high level to indicate that the inductor current is less than zero occurs.

FIG. 4 is a schematic diagram showing key waveforms associated with inductor current zero-crossing detection in a zero-crossing state detection device 200 according to an embodiment of the present disclosure. As shown in FIG. 4, the converter experiences two dead zones in each switching cycle, namely, a dead-zone-1 after the NMOS power switch is turned off (that is, GD_N equals L) and before the PMOS power switch is turned on (that is, GD_P equals L), and a dead-zone-2 after the PMOS power switch is turned off (that is, GD_P equals H) and before the NMOS power switch is turned on (that is, GD_N equals H). Regardless of whether the load is light or heavy, the inductor current of the inductor L is greater than zero during the dead-zone-2, at which time the inductor current freewheels through the diode D2 of the NMOS power switch, and the voltage at the switch node SW is approximately −0.7V.

The zero-crossing state indication circuit 202 is further explained below, assuming that the zero-crossing state indication circuit 202 includes the first inverter K1, the first flip-flop DFF1, the second flip-flop DFF2, and the second inverter K2, which are connected in sequence.

Specifically, as shown in FIG. 2, the first inverter K1 inverts the output voltage of the collector of the transistor Q, and outputs the first logic signal B to the first flip-flop DFF1; the first flip-flop DFF1 outputs the second logic signal C to the second flip-flop DFF2 based on the first logic signal B. The delay logic signal D is generated based on the first driving signal GD_P of the PMOS power switch and outputted to the second flip-flop DFF2; the second flip-flop DFF2 outputs the third logic signal to the second inverter K2 based on the sampling of the second logic signal C by the delay logic signal D; the second inverter K2 inverts the third logic signal, and outputs the indication signal E indicating the zero-crossing state of the inductor L.

Specifically, in one embodiment, the output voltage of the collector of the transistor Q determines the zero-crossing state of the inductor L as follows: 1) when the transistor Q is turned on by the voltage monitored at the switch node SW, the output voltage of the collector of the transistor Q is pulled down to a low level, the first logic signal B is at a high level, the second logic signal C is at a low level, the third logic signal is at a high level, and the indication signal E of the zero-crossing state of the inductor L is at a low level, indicating that the inductor current of the inductor L is greater than zero; 2) when the transistor Q is turned off by the voltage monitored at the switch node SW, the output voltage of the collector of the transistor Q is at the power supply voltage, the first logic signal B, the second logic signal C and the third logic signal are all at a low level, and the indication signal E of the zero-crossing state of the inductor L is at a high level, indicating that the inductor current of the inductor L is less than zero.

In one embodiment, the reset logic signal is generated to the first flip-flop DFF1 based on the second driving signal GD_N of the NMOS power switch, so that the first flip-flop DFF1 resets the second logic signal C outputted by the first flip-flop DFF1 after the PMOS power switch is turned off and before the NMOS power switch is turned on in the previous switching cycle, based on the reset logic signal.

Specifically, as shown in FIG. 4, during the dead-zone-1 stage: 1) When the inductor current of the inductor L>0A, the voltage at the switch node SW is −0.7V. At this time, the transistor Q is turned on to pull down the detection voltage A, the first logic signal B outputted after the detection voltage A enters the first inverter K1 generates a rising edge, and the first flip-flop DFF1 outputs the second logic signal C=H. Then, the voltage of the second logic signal C is sampled by a Get-Pulse logic D (i.e., the delay logic signal D) generated by the delay of the first driving signal GD_P of the PMOS power switch. The flip-flop DFF2 outputs the third logic signal, and the third logic signal is subjected to first-order inversion via the second inverter K2 to obtain the indication signal E which indicates the zero-crossing state of the inductor current of the inductor L, wherein the indication signal E equals L. 2) When the inductor current of the inductor L<0A, the voltage at the switch node SW during the dead-zone-1 stage is VIN+0.7V. At this time, the transistor Q is turned off, and the detection voltage A is at the power supply voltage, the first logic signal B equals L, and the flip-flop DFF1 outputs the second logic signal C which equals L, maintaining the previous reset state. Then, the voltage of the second logic signal C is sampled by the Get-Pulse logic D generated by the delay of the first driving signal GD_P of the PMOS power switch. The flip-flop DFF2 outputs the third logic signal, and the third logic signal is subjected to first-order inversion to obtain the indication signal E which indicates the zero-crossing state of the inductor L, wherein the indication signal E equals H.

The reset logic R of the flip-flop DFF1 is a Reset-Pulse R generated by the delay of the second driving signal GD_N of the NMOS power switch. The reset logic R is used for resetting the logic signal C output by the flip-flop DFF1, which is set to a high level by the voltage at the switch node SW during the dead-zone-2 stage, ensuring the correct detection of the voltage at the switch node SW during the dead-zone-1 stage in each switching cycle.

Therefore, within each switching cycle, the indication signal E, which indicates the zero-crossing state of the inductor L and equals H, indicates that the inductor current of the inductor L is less than zero, which means that the load is light at this time. Hence, the zero-crossing state detection device 200 of the converter of the present disclosure does not need a comparator and introduction of offset, and can better achieve accurate detection of the zero-crossing state of the inductor current of the inductor L with high efficiency. This zero-crossing state detection device 200 is suitable for real-time monitoring of load currents when working in a high-frequency PWM mode, so as to achieve smooth switching between different working modes of light load and heavy load.

Furthermore, as shown in FIG. 3, the present disclosure also provides a converter device 300. The converter device 300 includes a converter and a zero-crossing state detection device 200 for the converter as described above. The converter is, but not limited to, a BUCK converter, a BOOST converter, etc.

In one embodiment, the converter includes: a first type of power switch M1 electrically coupled between an input terminal and a switch node SW; a second type of power switch M2 electrically coupled between the switch node SW and a ground terminal; an inductor L electrically coupled between the switch node SW and an output terminal; a power switch driving circuit 302 electrically coupled to the first type of power switch M1 and the second type of power switch M2; and a converter loop control circuit 304 controlling the power switch driving circuit 302. More details of the zero-crossing state detection device 200 of the converter can be found in previously described embodiments.

In summary, the zero-crossing state detection device for the converter according to embodiments of the present disclosure can efficiently and accurately monitor the zero-crossing state of the inductor current cycle by cycle in real-time, indirectly determine the actual output load of the current converter, which can serve as a basis for switching between different operating modes of light load and heavy load of the converter. Therefore, the present disclosure effectively overcomes various disadvantages in the prior art and has high industrial utilization value.

The above embodiments are only illustrative of the principles and effects of the present disclosure, and are not intended to limit the present disclosure. Any person skilled in the art can modify or change the above embodiments without departing from the spirit and scope of the present disclosure. Therefore, all equivalent modifications or changes completed by those with ordinary knowledge in the technical field without departing from the spirit and technical idea revealed by the present disclosure should still be covered by the claims of the present disclosure.

What is claimed is:

1. A zero-crossing state detection device for a converter, the converter comprising a first type of power switch electrically coupled between an input terminal and a switch node, a second type of power switch electrically coupled between the switch node and a ground terminal, and an inductor electrically coupled between the switch node and an output terminal, the zero-crossing state detection device comprising:
   a zero-crossing state indication circuit configured to generate an indication signal indicating a zero-crossing state of an inductor current flowing through the inductor, according to a first driving signal and a second driving signal respectively applied to the first type of power switch and the second type of power switch, based on a voltage at the switch node after the second type of power switch is turned off and before the first type of power switch is turned on; wherein the zero-crossing state indication circuit is configured to:
   generate a first indication signal indicating that an event of the inductor current being less than zero occurs if the voltage at the switch node is a first preset value; and
   generate a second indication signal indicating that the event of the inductor current being less than zero has not occurred if the voltage at the switch node is a second preset value.

2. The zero-crossing state detection device of claim 1, wherein the zero-crossing state indication circuit is configured to generate the indication signal indicating whether the inductor current crosses zero within a switching cycle corresponding to the first driving signal and the second driving signal, in response to an active edge of the first driving signal.

3. The zero-crossing state detection device of claim 1, further comprising:
   a transistor having a control terminal electrically coupled to a reference voltage terminal, a first conductive terminal electrically coupled to the switch node, and a second conductive terminal electrically coupled to a power source terminal and electrically coupled to the zero-crossing state indication circuit.

4. The zero-crossing state detection device of claim 3, wherein the zero-crossing state indication circuit is configured to:
   generate a first indication signal indicating that an event of the inductor current being less than zero occurs, if the voltage at the switch node causes the transistor to be turned off so that an output voltage at the second conductive terminal of the transistor is pulled up to a high level; and
   generate a second indication signal indicating that the event of the inductor current being less than zero has not occurred, if the voltage at the switch node causes the transistor to be turned on so that the output voltage at the second conductive terminal of the transistor is pulled down to a low level.

5. The zero-crossing state detection device of claim 3, wherein the zero-crossing state indication circuit comprises:
   a first flip-flop, electrically coupled to the second conductive terminal of the transistor, and configured to output an intermediate signal corresponding to an output voltage at the second conductive terminal of the transistor based on the second driving signal; and
   a second flip-flop, electrically coupled to an output terminal of the first flip-flop, and configured to output the indication signal corresponding to the intermediate signal based on the first driving signal.

6. The zero-crossing state detection device of claim 3, wherein the zero-crossing state indication circuit comprises a first inverter, a first flip-flop, a second flip-flop, and a second inverter, which are connected in sequence;
   the first inverter inverts an output voltage of the second conductive terminal of the transistor to output a first logic signal to the first flip-flop;
   the first flip-flop outputs a second logic signal to the second flip-flop based on the first logic signal;
   the second flip-flop receives a delay logic signal generated based on the first driving signal, and samples the second logic signal based on the delay logic signal to output a third logic signal to the second inverter;
   the second inverter inverts the third logic signal to output the indication signal indicating the zero-crossing state of the inductor current.

7. The zero-crossing state detection device of claim 6, wherein the zero-crossing state indication circuit is configured to:
   generate the indication signal at a low level to indicate that the inductor current is greater than zero, when the voltage at the switch node causes the transistor to be turned on so that the output voltage at the second conductive terminal of the transistor is pulled down to a low level, and the first logic signal, the second logic signal and the third logic signal are all at a high level;
   generate the indication signal at a high level to indicate that an event of the inductor current being less than zero occurs, when the voltage at the switch node causes the transistor to be turned off so that the output voltage at the second conductive terminal of the transistor is equal to a power supply voltage, and the first logic signal, the second logic signal and the third logic signal are all at a low level.

8. The zero-crossing state detection device of claim 6, wherein the first flip-flop receives a reset logic signal generated based on the second driving signal, such that the first flip-flop resets the second logic signal output by the first flip-flop after the first type of power switch is turned off and before the second type of power switch is turned on within a previous switching cycle, based on the reset logic signal.

9. The zero-crossing state detection device of claim 3, further comprising a current source electrically coupled between the second conductive terminal of the transistor and the power source terminal.

10. The zero-crossing state detection device of claim 3, wherein the reference voltage of the reference voltage terminal is less than a conduction voltage of a first freewheeling diode or a second freewheeling diode parasitically paralleled with the first type of power switch or the second type of power switch.

11. The zero-crossing state detection device of claim 1, wherein the first type of power switch comprises a PMOS power switch, and the second type of power switch comprises an NMOS power switch.

12. The zero-crossing state detection device of claim 11, wherein the transistor comprises a bipolar junction transistor.

13. The zero-crossing state detection device of claim 12, wherein the zero-crossing state indication circuit is configured to:
  generate a first indication signal indicating that an event of the inductor current being less than zero occurs if the voltage at the switch node is equal to an input voltage of the input terminal plus 0.7V such that the transistor is turned off; and
  generate a second indication signal indicating that the event of the inductor current being less than zero has not occurred if the voltage at the switch node is equal to −0.7V such that the transistor is turned on.

14. A converter device, comprising:
  a converter, comprising a first type of power switch electrically coupled between an input terminal and a switch node, a second type of power switch electrically coupled between the switch node and a ground terminal, an inductor electrically coupled between the switch node and an output terminal, a power switch driving circuit electrically coupled to the first type of power switch and the second type of power switch, and a converter loop control circuit for controlling the power switch driving circuit; and
  a zero-crossing state detection device, comprising a zero-crossing state indication circuit configured to generate an indication signal indicating a zero-crossing state of an inductor current flowing through the inductor, according to a first driving signal and a second driving signal respectively applied to the first type of power switch and the second type of power switch, based on a voltage at the switch node after the second type of power switch is turned off and before the first type of power switch is turned on; wherein the zero-crossing state indication circuit is configured to:
    generate a first indication signal indicating that an event of the inductor current being less than zero occurs if the voltage at the switch node is a first preset value; and
    generate a second indication signal indicating that the event of the inductor current being less than zero has not occurred if the voltage at the switch node is a second preset value.

15. The converter device of claim 14, wherein the zero-crossing state indication circuit is configured to:
  generate a first indication signal indicating that an event of the inductor current being less than zero occurs if the voltage at the switch node is a first preset value; and
  generate a second indication signal indicating that the event of the inductor current being less than zero has not occurred if the voltage at the switch node is a second preset value.

16. The converter device of claim 14, wherein the zero-crossing state indication circuit is configured to generate the indication signal indicating whether the inductor current crosses zero within a switching cycle corresponding to the first driving signal and the second driving signal, in response to an active edge of the first driving signal.

17. The converter device of claim 14, wherein the zero-crossing state detection device further comprises:
  a transistor having a control terminal electrically coupled to a reference voltage terminal, a first conductive terminal electrically coupled to the switch node, and a second conductive terminal electrically coupled to a power source terminal and electrically coupled to the zero-crossing state indication circuit.

18. The converter device of claim 17, wherein the zero-crossing state indication circuit is configured to:
  generate a first indication signal indicating that an event of the inductor current being less than zero occurs, if the voltage at the switch node causes the transistor to be turned off so that an output voltage at the second conductive terminal of the transistor is pulled up to a high level; and
  generate a second indication signal indicating that the event of the inductor current being less than zero has not occurred, if the voltage at the switch node causes the transistor to be turned on so that the output voltage at the second conductive terminal of the transistor is pulled down to a low level.

19. The converter device of claim 17, wherein the zero-crossing state indication circuit comprises:
  a first flip-flop, electrically coupled to the second conductive terminal of the transistor, and configured to output an intermediate signal corresponding to an output voltage at the second conductive terminal of the transistor based on the second driving signal; and
  a second flip-flop, electrically coupled to an output terminal of the first flip-flop, and configured to output the indication signal corresponding to the intermediate signal based on the first driving signal.

* * * * *